United States Patent [19]

Willoughby

[11] Patent Number: 4,678,394

[45] Date of Patent: Jul. 7, 1987

[54] FLUID CURRENT DRIVEN MACHINE EMPLOYING INDIVIDUALLY SELF-GOVERNING ENERGY PANELS

[76] Inventor: Francis E. Willoughby, Box 689, Pine Bluffs, Wyo. 82082

[21] Appl. No.: 760,542

[22] Filed: Jul. 30, 1985

[51] Int. Cl.$^4$ ............................ F03D 3/04; F03D 7/06
[52] U.S. Cl. ...................................... 415/2 R; 415/4; 416/119; 416/41; 416/16
[58] Field of Search ................. 416/119, 41 R, 139 A, 416/117, 16; 415/2 R–4R

[56] References Cited

U.S. PATENT DOCUMENTS

| | | | |
|---|---|---|---|
| 297,904 | 4/1884 | Witherspoon | 416/119 |
| 325,025 | 8/1885 | Tefft | 416/139 A X |
| 330,014 | 11/1885 | Gilman | 416/117 X |
| 387,102 | 7/1888 | Nagel | 416/41 R |
| 410,132 | 8/1889 | Witherell | 415/3 R X |
| 508,009 | 11/1893 | George | 416/121 A X |
| 583,171 | 5/1897 | Curry | 416/119 X |
| 885,141 | 4/1908 | Brown | 416/119 |
| 1,099,602 | 6/1914 | Houtz | 415/4 R |
| 1,321,415 | 11/1919 | Brown | 416/119 X |
| 1,650,618 | 11/1927 | Erickson | 415/2 R |
| 4,315,713 | 2/1982 | Verplanke | 415/2 R |
| 4,530,638 | 7/1985 | Andruszkiw et al. | 415/4 R |

FOREIGN PATENT DOCUMENTS

| | | | |
|---|---|---|---|
| 168359 | 5/1951 | Austria | 415/4 R |
| 2738067 | 3/1979 | Fed. Rep. of Germany | 416/117 |
| 40341 | 6/1932 | France | 416/117 |
| 1048392 | 12/1953 | France | 415/2 R |
| 84871 | 6/1980 | Japan | 416/41 R |
| 47683 | 4/1981 | Japan | 416/41 R |
| 301091 | 1/1930 | United Kingdom | 416/119 |
| 2119025 | 11/1983 | United Kingdom | 416/140 R |

Primary Examiner—Everette A. Powell, Jr.
Attorney, Agent, or Firm—James H. Phillips

[57] ABSTRACT

The self-governing energy panel is to be used as one of a group of panels designed to collect wind for and govern the speed of the windpowered traveling shaft machine. This machine is designed to convert windpower into other forms of energy (e.g. electricity or direct-drive) by connection to a generator or other device. The panel is hung on bearings that are on the support beams that protrude out from the horizontal shaft of the windpowered traveling shaft machine. The panel has the majority of its length below the bearings; however, there are several places the panel may be attached to the beams thus changing how much of the panel is above or below the bearings. The panel will hang vertically to the ground in calm periods but with increasing wind speed the panel can change to a completely horizontal position by rotating on the bearings. Weights of various sizes may be added to the bottom of the panel, which along with the bearing position, will control at what wind speed the panel wall reach different angled positions. An enclosure is required around the approximate bottom one-third of the machine. The force of the wind will cause the panel to carry the support beam in a forward direction and turn the main horizontal shaft of the windpowered traveling shaft machine which will turn a generator or other device to produce electricity or mechanical power. The size of the windpowered traveling shaft machine determines the wind speed that it will withstand. It is a fixed-base machine.

4 Claims, 6 Drawing Figures

FLUID CURRENT DRIVEN MACHINE EMPLOYING INDIVIDUALLY SELF-GOVERNING ENERGY PANELS

BACKGROUND OF THE INVENTION

This invention relates in general to all machines that generate power by use of wind or water. In particular it relates to fixed based wind or water powered generating machines.

Each of the self-governing energy panels is programmed by adding weights to the hollow tubing in the bottom of the panel and by adjusting the length of the panel's swing by a choice of bearing locations on the panel frame itself. The panel swings freely usually remaining in a vertical position related to the ground but can be pushed by the wind into a horizontal position in relation to the ground. In addition, as the wind increases and further blows the panel out from its normally lateral position torque will be increased and the displaced panel will slow down the revolutions of the machine around its central rotating axis compared to the number of revolutions that could be expected if the panels remained in a strictly vertical position. This feature enables the self-governing energy panels on the windpowered traveling shaft machine to continue operation in higher winds that would otherwise damage a permanently fixed vertical panel. This displacement feature for wind and its self-governing nature are what place this invention into a unique category for wind-powered machines. This design also enables the machine to be built in a variety of sizes. In an effort to show the improvements that the self-governing energy panels on the windpowered traveling shaft machine have over other similar inventions, the following list of U.S. patents discloses items with features which have been conceived similarly in nature:

| DOCUMENT NO. | PATENTEE | ISSUE DATE |
|---|---|---|
| 297904 | Witherspoon | 4-1884 |
| 387102 | Nagel | 7-1888 |
| 410132 | Witherell | 8-1889 |
| 583171 | Curry | 5-1897 |
| 885141 | Brown, O.E. | 4-1908 |
| 1099602 | Houtz | 6-1914 |
| 1321415 | Brown, A.E. | 11-1919 |
| 1650618 | Erickson | 11-1927 |
| 4315713 | Verplanke | 2-1982 |

Also, the following foreign patents are considered as similar:

| DOCUMENT NO. | COUNTRY | NAME | ISSUE DATE |
|---|---|---|---|
| 168359 | Austria | Hausher | 5-1951 |
| 84871 | Japan | — | 6-1980 |
| 47683 | Japan | — | 4-1981 |

In Witherspoon's invention, the sails have mechanized spring stops as compared to the panels on this invention which have no stops and are governed by weight only. Also, there is only one bearing supporting the turning structure. The sails hang on their end and are not controlled by weight.

In Nagel's invention, there are no weights controlling the pyramidal cups, and the cups are apparently regulated by an individual opening and closing doors instead of by self-regulation.

Witherell's invention uses water instead of air to turn the axis. The blades also stop with a mechanical stop and have no self-governing features.

Curry's invention is designed for use in the water. His added weights are distributed evenly throughout the lower half of the blade which while appropriate for the water is not effective for controlling air movements. His invention also applies power to a source rather than taking power from the outside source.

O. E. Brown's invention has holes in its blades since they are designed for use in water. This invention also uses mechanical stops for the blades. It applies power to the water as opposed to taking power from the water to provide energy.

In Houtz's invention, there are no weights controlling the speed of the axis but a mechanically raised shield that controls the amount of wind striking the blades. The blades are fixed to the central axis. Panels are not used to govern this machine.

In A. E. Brown's invention, the panels have stops and are hinged at the top. They lock in position, have no weight adjustments at the bottom of the panels and are not self-governing.

In Erickson's invention, the blades are curved and are fixed onto the central axis. There is no automatic provision for the controlling the rate of revolutions except by wind speed. An operator has to manually raise a wind shield to slow or speed up the machine for any given wind speed.

In Verplanke's invention, the blades are curved and fixed onto a central axis. Panels are not used. There are no weights nor self-governing devices for the machine.

On Hauhser's invention (Austria), the blades are hinged at the top but have no weight adjustment or panel adjustment device. This machine rotates parallel (horizontally) to the ground as opposed to rotating in a perpendicular manner (vertical to the ground).

On the June 1980 Japanese invention, there are no hinged panels with weights. The blades are supported on the outside of the wheel, have stops, and are controlled by spring pressure.

On the April 1981 Japanese invention, there are no weights for the blades which have stoppers and are returned to a normal position by spring pressure. This machine rotates parallel (horizontally) to the ground as opposed to rotating in a perpendicular manner (vertical to the ground).

SUMMARY OF THE INVENTION

The self-governing energy panels on the windpowered traveling shaft machine provide a self-governing method for producing energy in low or high winds. The wind blowing into the panel covering will turn the wheel around the central rotating axis which will then turn other ancillary devices that will produce electricity or similar power. In higher winds, the panels will be displaced so that their bottoms move away from the direction from which the wind is coming. This feature increases the torque on the machine and helps reduce the number of revolutions per minute that the machine turns so that the panels act as a self-governing device that keeps the machine from spinning out of control or damaging itself in higher winds. The tendency is for the wind to catch the panel towards the top of its radius and carry it forward to a point where the wind panel is covered by the wind shield. Also, since this machine can easily be built in different sizes, the size of the machine itself can help govern its revolutions per minute since a fifty-foot radius machine will make fewer turns in a fifty mile-per-hour wind than would a five-foot radius machine. The wind shield on this machine is used to shield the machine from countervailing winds and not to control the speed of the machine.

DESCRIPTION OF THE PREFERRED EMBODIMENT

Figure 1:
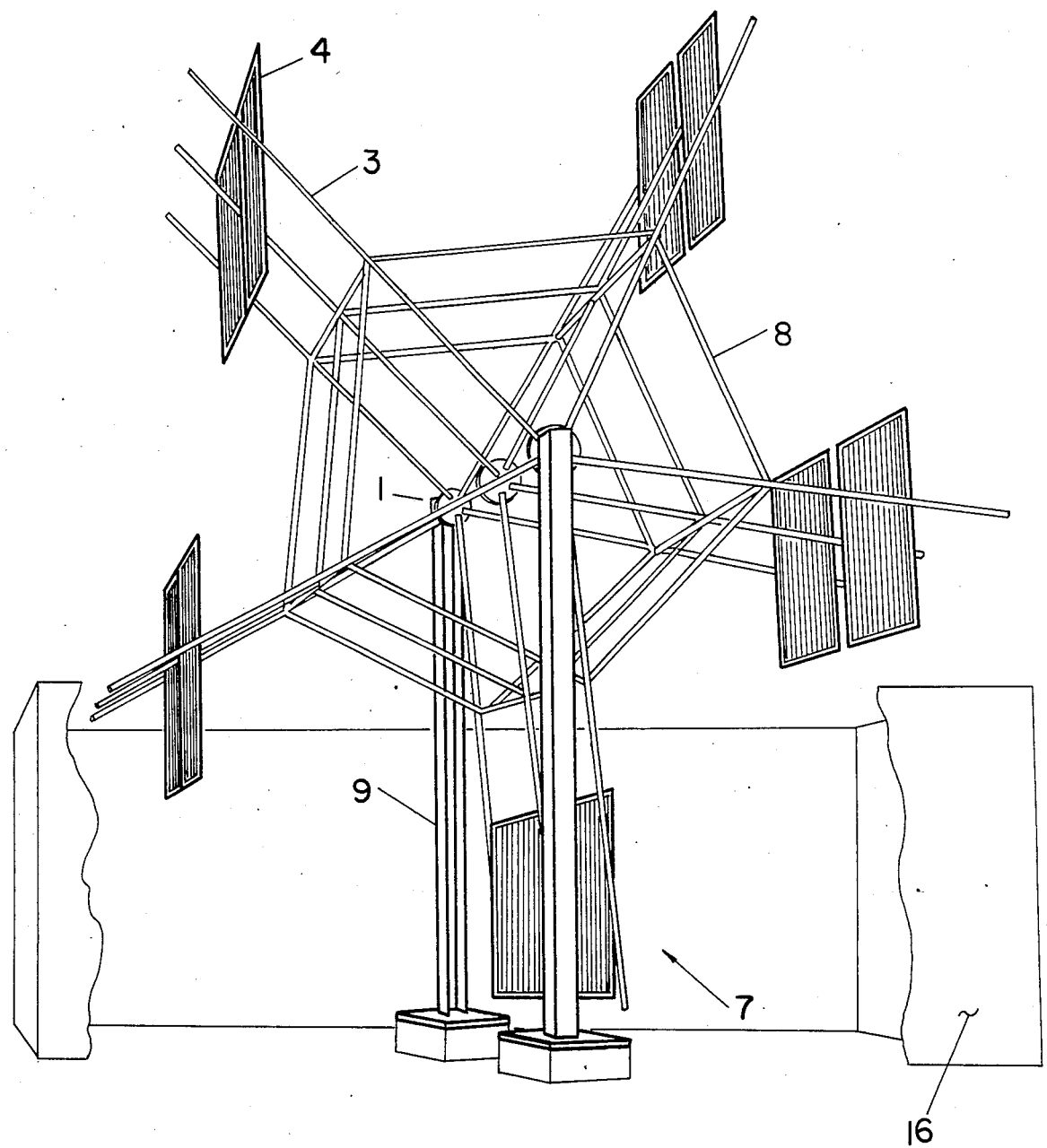
FIG. 1 is a full side view of the windpowered traveling shaft machine with the self-governing energy panels.

For the purposes of promoting an understanding of the principles of this invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which this invention relates.

Referring to FIG. 1, there is a windpowered traveling shaft machine 7 which revolves a central horizontal rotating axis 1 which when rotated will turn other ancillary devices (not shown) which are connected to or are part of the machine (e.g. a generator). For illustrative purposes the panels 4 are mounted in pairs towards the end of five sets of support beams 3 radiating out from the central rotating axis 1 of the machine. For two panels, there must be three support beams in each set. The support beams 3 are braced by sets of lateral beams 8 that connect the different sets of the support beams 3. The support beams are fixed to the horizontal axis 1. Two pillars 9 in turn support the axis. Different sizes of the machine can be constructed. A wind screen 16, approximately one-third the height of the machine is needed to protect the machine from countervailing winds. The wind screen should be open at the bottom to allow for smooth airflow.

Figure 2:
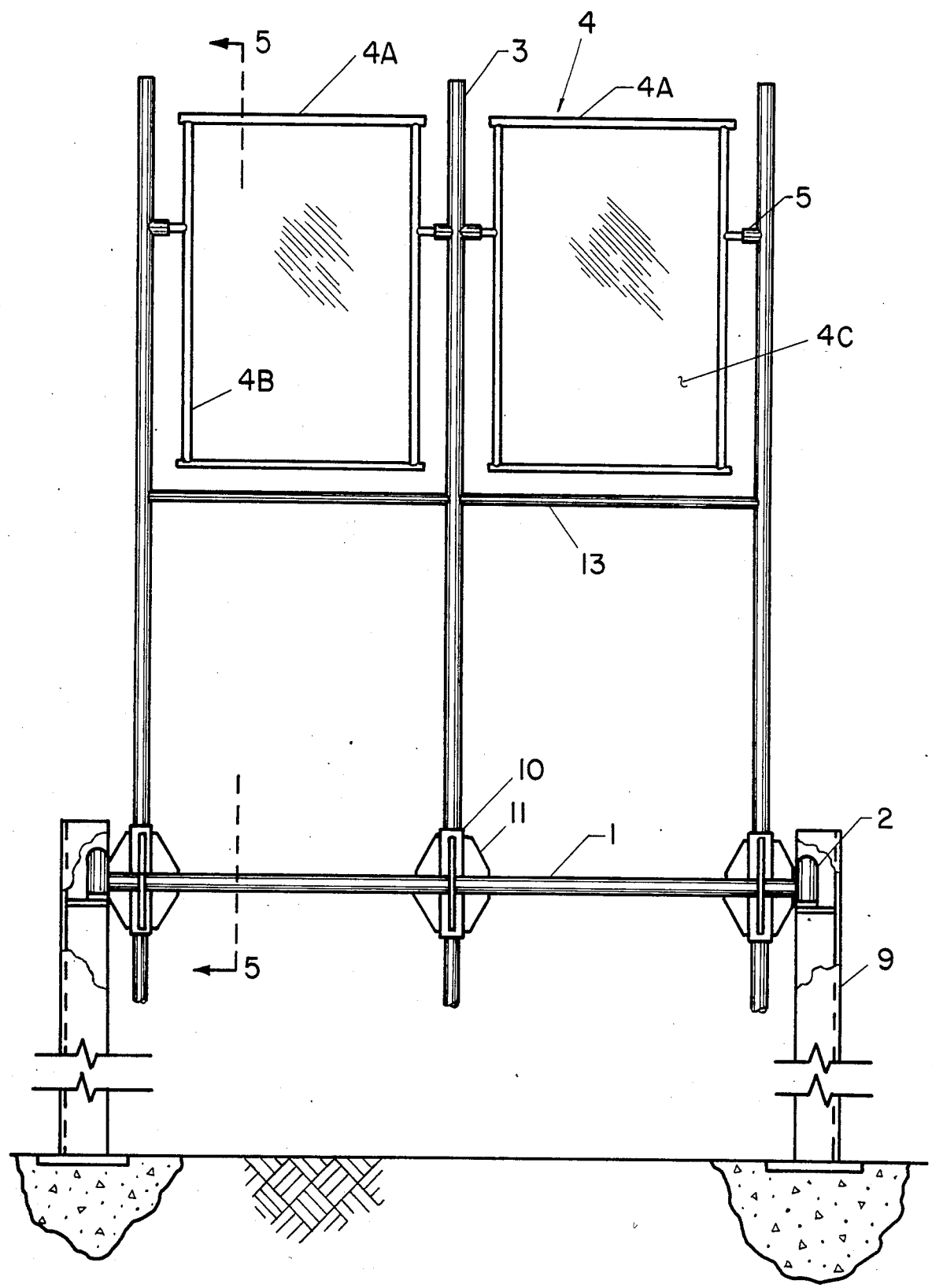
FIG. 2 is a front view of the windpowered traveling shaft machine with the self-governing energy panels.
Figure 3:
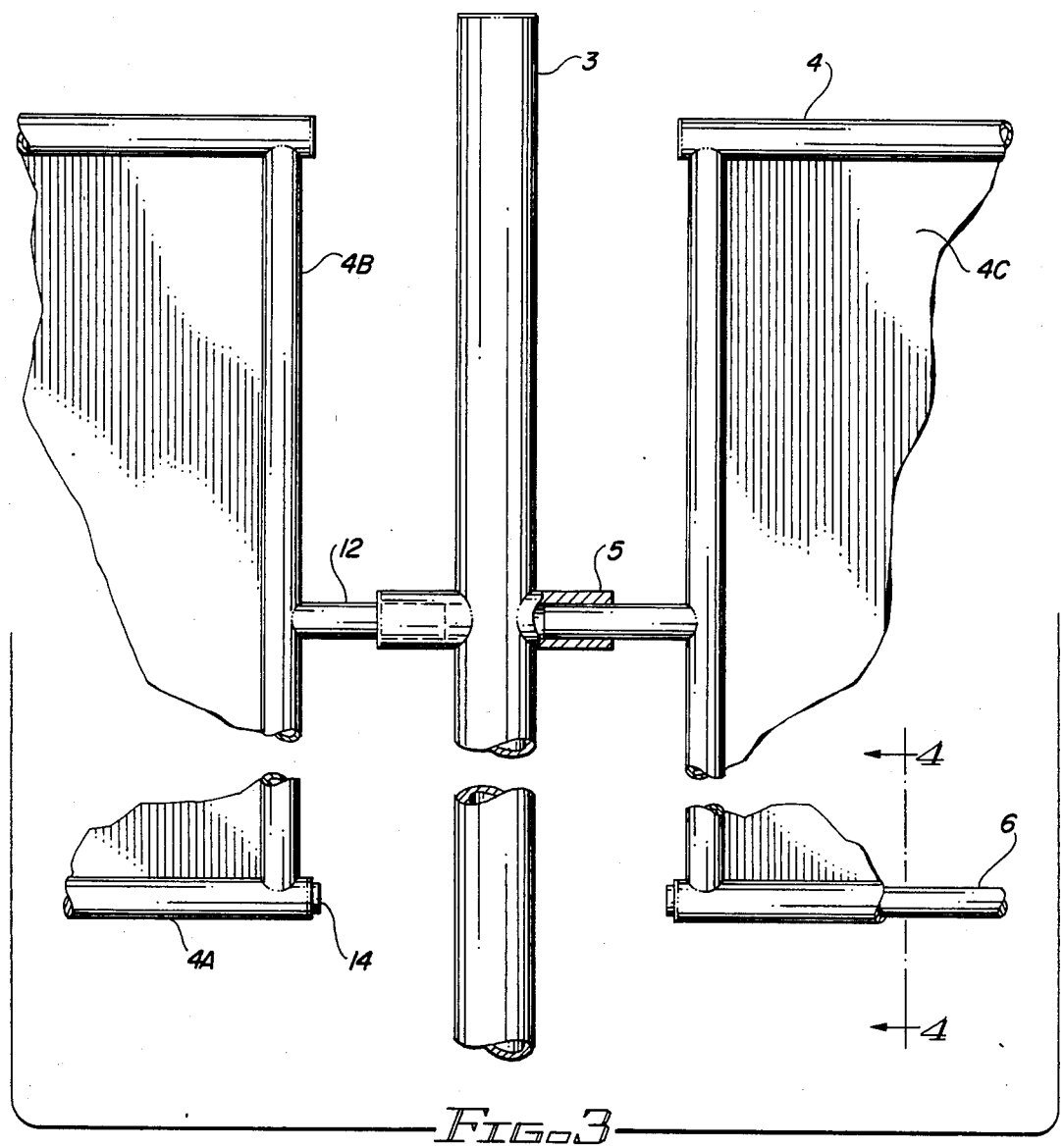
FIG. 3 is a segmented partial view of the bearings connecting the panels to the support beams of the windpowered traveling shaft machine.

Referring to FIG. 2, there is shown the central horizontal axis 1 which rotates when the self-governing energy panels 4 are pushed by the wind. The axis is attached to two pillow block bearings 2 located at either end of the axis in the pillars 9. The support beams 3 are attached to the axis 1 by means of sockets 10 attached to the axis. These sockets 10 are further supported by brackets 11 which are attached to both the socket 10 and the axis 1. As best shown in FIG. 3, the self-governing energy panel 4 is attached to the support beams 3 by inserting male connections 12 into the female sockets 5 of the support beams. Additional support for the support beams can be provided by the horizontal beam supports 13 permanently attached to the support beams. As can be noted in the figure, the pillars 9 are permanently anchored in the ground. The self-governing energy panels 4 have a panel surface 4C that can be of any type of material that can be mounted to the panel support structure, which consists of horizontal support frames 4A and vertical support frames 4B.

Referring again to FIG. 3, the male connections 12 can be clearly seen inserted into the female sockets 5 which are attached to the support beam 3. These form the bearings for the panel.

Figure 4:
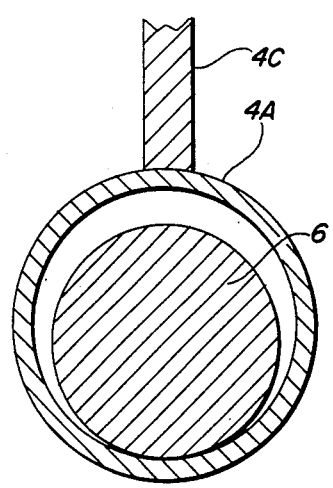
FIG. 4 is a detailed illustration of the hollow bottom beam that may contain weights of various sizes.

In FIG. 4, the weight 6 is shown inside the bottom hollow tube horizontal support frame 4A. The weight/s 6 are held in the bottom beam by capping the beam with a stub shaft (plug) 14 that is either inserted into the beam or is welded onto the beam as illustrated in FIG. 3.

Figure 5:
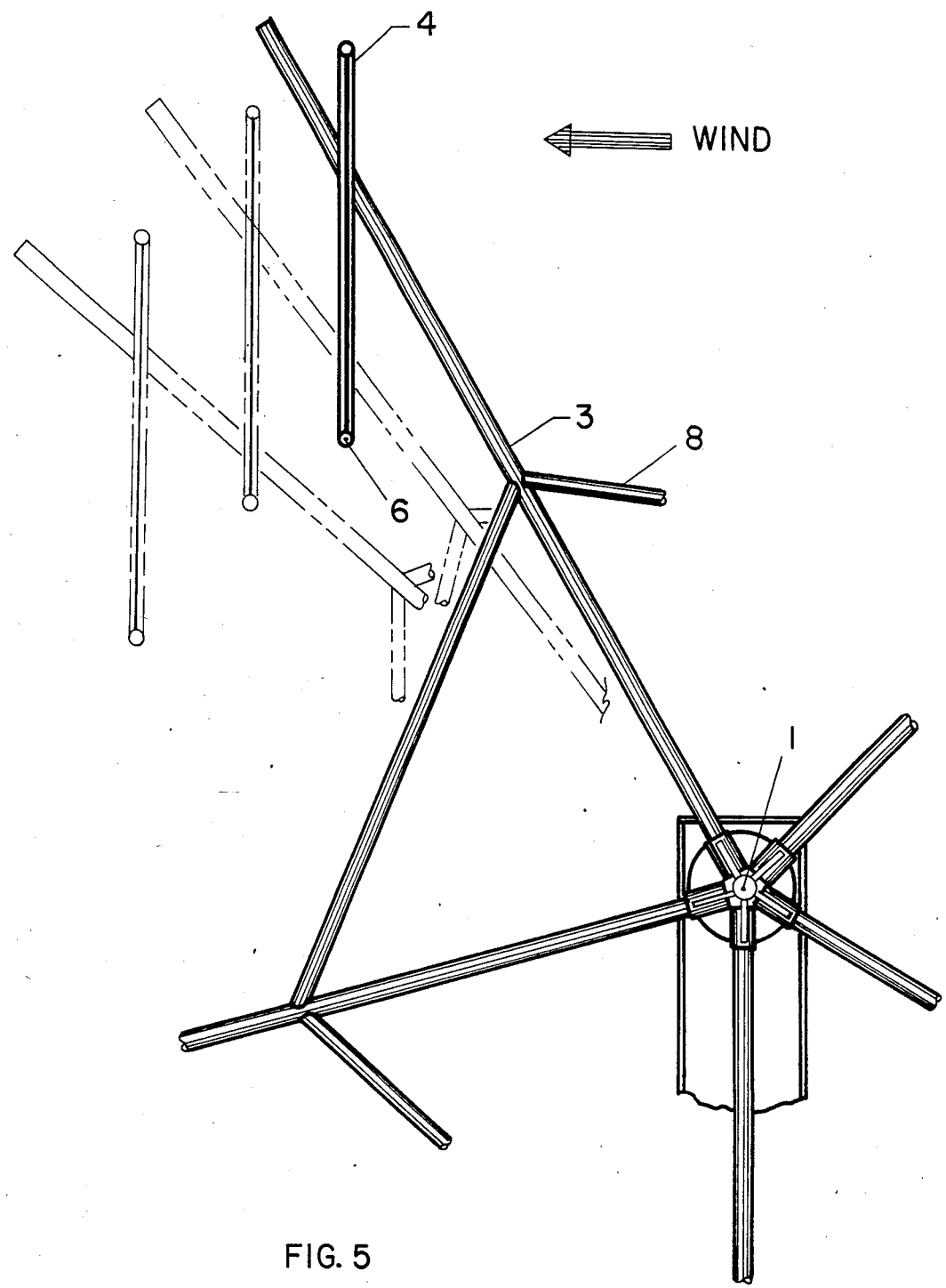
FIG. 5 is a detailed illustration from the side of the support beam structure holding the self-governing energy panels in relatively calm wind.

FIG. 5 shows the effect of a light wind on the machine and panels with the machine rotating in this case in a counter-clockwise direction since the wind is coming from the right. With the weights 6 in the bottom of the self-governing energy panel 4, the panel remains virtually perpendicular relative to the ground as it rotates around the central axis 1.

Figure 6:
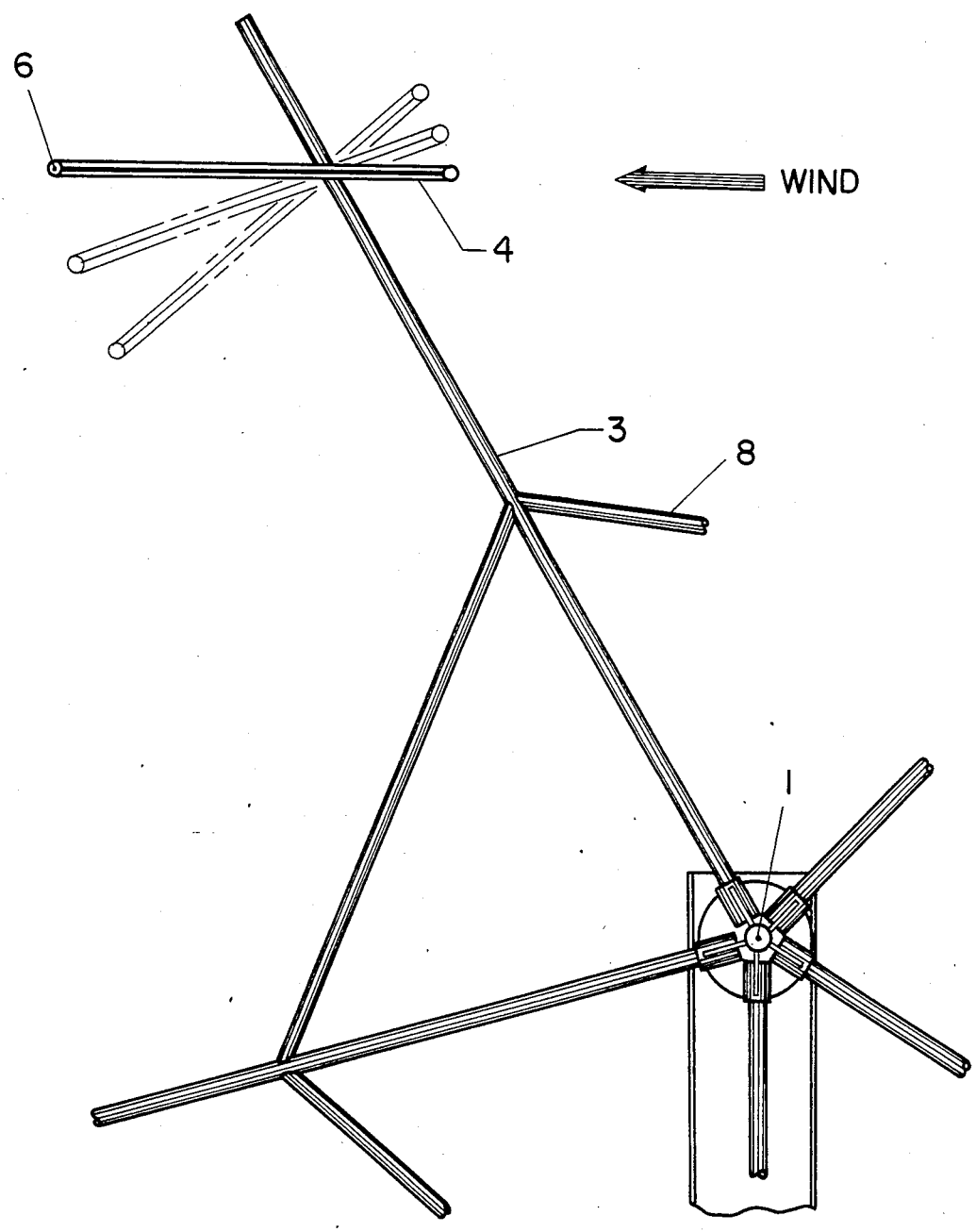
FIG. 6 is a detailed illustration from the side of the support beam structure holding the self-governing energy panels in higher winds.

In FIG. 6, the self-governing energy panel 4 can be seen to have moved to other positions relative to increasing wind speed so that at some wind speed the panel 4 will become parallel to the surface of the ground with the weights 6 extending away from the direction of the wind.

What is claimed for this invention is:

1. A fluid powered traveling shaft machine adapted to be fixed in position within a fluid current and for developing rotational power therefrom, said machine comprising:
   (A) a horizontal central rotating axis;
   (B) a plurality of sets of support beams extending radially outwardly from said central axis at a corresponding plurality of circumferentially distributed positions thereabout;
      1. each said set of support beams comprising at least two parallel support beams;
   (C) panel support means carried by each of said support beams at equal radially outward distances from said central axis, said panel support means of a set of support beams cooperating to define a horizontal panel axis of rotation;
   (D) at least one rectangular suspended panel rotatably supported by said panel support means in each said panel axis of rotation, said suspended panel having length and width dimensions, said suspended panel being supported by said panel support means at a position intermediate its said length and offset from the center thereof;
   (E) adjustable gravity bias means for urging each said suspended panel to rotate about its said panel axis of rotation toward a vertical position in which the center of said length of said panel is disposed below its said panel axis of rotation, said adjustable gravity bias means comprising:
      1. discrete added weight means fixed to said suspended panel at the lower end thereof when said suspended panel is in said vertical position; and
   (F) a screen shielding at least the lower one-third of the height of said machine from the fluid current.

2. The machine of claim 1 in which each said set of support beams includes more than two parallel beams and in which a plurality of said suspended panels are supported in each said panel axis of rotation.

3. The machine of claim 1 in which said gravity bias means acting on each said suspended panel further includes a horizontal hollow tube situated at the lower end of said suspended panel and in which said discrete added weight means is carried within said hollow tube.

4. The machine of claim 2 in which said gravity bias means acting on each said suspended panel further includes a horizontal hollow tube situated at the lower end of said suspended panel and in which said discrete added weight means is carried within said hollow tube.

* * * * *